(12) United States Patent
Kosuge et al.

(10) Patent No.: US 9,731,672 B1
(45) Date of Patent: Aug. 15, 2017

(54) FRONT WALL STRUCTURE FOR A UTILITY VEHICLE

(71) Applicant: KAWASAKI JUKOGYO KABUSHIKI KAISHA, Hyogo (JP)

(72) Inventors: Hideyoshi Kosuge, Kobe (JP);
Kazumasa Hisada, Akashi (JP);
Masato Kinoshita, Kakogawa (JP);
Masayuki Shibata, Kakogawa (JP);
Ryo Nishio, Kobe (JP); Yuichi Fujii, Kakogawa (JP); Takeshi Tanaka, Hyogo (JP); Takuma Komatsu, Takasago (JP); Hirotaka Fujiki, Himeji (JP)

(73) Assignee: KAWASAKI JUKOGYO KABUSHIKI KAISHA, Hyogo (JP)

(*) Notice: Subject to any disclaimer, the term of this patent is extended or adjusted under 35 U.S.C. 154(b) by 0 days.

(21) Appl. No.: 15/091,849

(22) Filed: Apr. 6, 2016

(51) Int. Cl.
*B62D 21/00* (2006.01)
*B60R 19/54* (2006.01)
*B62D 33/06* (2006.01)

(52) U.S. Cl.
CPC .............. *B60R 19/54* (2013.01); *B62D 21/00* (2013.01); *B62D 33/06* (2013.01)

(58) Field of Classification Search
CPC ....... B60J 11/06; B60R 13/0861; B62D 25/16
See application file for complete search history.

(56) References Cited

U.S. PATENT DOCUMENTS

| | | | | |
|---|---|---|---|---|
| 5,358,300 A * | 10/1994 | Gray | ................ | B60H 1/00028 296/192 |
| 6,524,691 B2 * | 2/2003 | Sugawara | ................ | B32B 5/02 181/286 |
| 7,399,020 B2 * | 7/2008 | Aoyama | ................ | B60R 13/08 296/39.3 |
| 8,220,864 B2 * | 7/2012 | Mildner | ................ | B62D 25/14 296/187.09 |
| 8,585,088 B1 | 11/2013 | Kaku et al. | | |
| 9,469,351 B2 * | 10/2016 | Roehrl | ................ | B62D 21/152 |
| 2006/0137936 A1 * | 6/2006 | Schulze | ............... | B29C 44/1261 181/290 |
| 2006/0151222 A1 * | 7/2006 | Tinti | ................... | B60R 13/0838 180/69.22 |
| 2015/0252716 A1 * | 9/2015 | Tanno | .................... | B60K 13/04 123/41.58 |
| 2015/0375795 A1 * | 12/2015 | Freis | ........................ | B21J 15/36 296/191 |

* cited by examiner

*Primary Examiner* — John Walters
*Assistant Examiner* — James Triggs
(74) *Attorney, Agent, or Firm* — Wenderoth, Lind & Ponack, L.L.P.

(57) ABSTRACT

A utility vehicle includes a pair of right and left front wheels, a pair of right and left rear wheels, a main frame positioned between the front wheels and the rear wheels and defining a cabin in the main frame, and a cabin front wall defining a front end of the cabin. The cabin front wall includes a cabin front wall body separating the cabin and a bonnet chamber provided ahead of the cabin, and includes a wheel housing wall separating between the cabin and each of right and left front wheel housings. The utility vehicle further includes a cabin guard covering an outer surface of the cabin front wall body.

11 Claims, 10 Drawing Sheets

FRONT WALL STRUCTURE FOR A UTILITY VEHICLE

BACKGROUND OF THE INVENTION

Field of the Invention

The present invention relates to a utility vehicle.

Description of the Related Art

There has been known a conventional utility vehicle provided with a cabin front wall defining the front end of a cabin, and the cabin front wall includes a cabin front wall body separating the cabin and a bonnet chamber provided ahead of the cabin, and includes wheel housing walls separating the cabin and wheel housings at the right and left lower ends of the cabin front wall body. There are also provided guards covering the outer surfaces of the wheel housing walls (see U.S. Pat. No. 8,585,088, for example).

The guards are configured to prevent entry to the wheel housings, of obstacles such as rocks and branches hit (kicked up or splashed) by front wheels.

SUMMARY OF THE INVENTION

The guards are positioned behind the front wheels to prevent obstacles hit by the front wheels from entering the wheel housings, and do not cover the entire cabin front wall. In a case where an obstacle flown up from a road surface or taken in occasionally enters the bonnet chamber, the obstacle may enter the cabin through the cabin front wall body.

The present invention has been made in view of the problem mentioned above, and an object thereof is to provide a utility vehicle configured to inhibit entry to a cabin through a cabin front wall, of an obstacle flown up from a road surface or taken in and entering a bonnet chamber.

In order to achieve the object mentioned above, the present invention provides a utility vehicle including a pair of right and left front wheels, a pair of right and left rear wheels, a main frame positioned between the front wheels and the rear wheels and defining a cabin in the main frame, and a cabin front wall defining a front end of the cabin, the cabin front wall including a cabin front wall body separating the cabin and a bonnet chamber provided ahead of the cabin, and including a wheel housing wall separating the cabin and each of right and left front wheel housings, the utility vehicle further including a cabin guard covering an outer surface of the cabin front wall body.

According to this configuration, the cabin front wall body has a double wall structure due to provision of the cabin guard covering the outer surface of the cabin front wall body. An obstacle flown up from a road surface or taken in and entering the bonnet chamber will thus be inhibited from entering the cabin through the cabin front wall.

The utility vehicle preferably has any of the following configurations.

(1) The cabin guard is a plate member, which is formed along the outer surface of the cabin front wall body.

According to the configuration (1), the cabin guard is easily attached to the cabin front wall body.

(2) The utility vehicle further includes a cross pipe provided adjacent to the cabin front wall and extending in a vehicle width direction, wherein the cross pipe is positioned above a vertically intermediate position of the cabin front wall, and the cabin guard extends from a lower end of the cabin front wall to a position just below the cross pipe in a vertical direction.

According to the configuration (2), the cabin front wall is provided, in the vertical direction, with the cabin guard below the portion having a double wall structure due to provision of the cross pipe. The cabin guard is inhibited from increasing in vertical size and the cabin front wall has the double wall structure of a predetermined vertical length. The cabin front wall is thus effectively made to have the double wall structure across the height.

(3) The utility vehicle further includes a dash panel provided to the cabin front wall on a surface facing the cabin, wherein the cabin guard extends from a lower end of the cabin front wall to a position just below the dash panel in a vertical direction.

According to the configuration (3), the cabin front wall is provided, in the vertical direction, with the cabin guard below the portion having a double wall structure due to provision of the dash panel. The cabin guard is inhibited from increasing in vertical size and the cabin front wall has the double wall structure of a predetermined vertical length. The cabin front wall is thus effectively made to have the double wall structure across the height.

(4) The utility vehicle further includes a front frame connected to a front end of the main frame and swingably supporting the pair of right and left front wheels, wherein the cabin guard is divided into two portions on each side of the front frame.

According to the configuration (4), the cabin guard is provided at each outer end in the vehicle width direction of the portion in the cabin front wall, where the front frame inhibits entry of an obstacle to the bonnet chamber in the vehicle width direction. The cabin guard is reduced in size in the vehicle width direction, and an obstacle will be inhibited from entering the cabin across the vehicle width.

(5) The utility vehicle further includes a wheel housing guard covering an outer surface of the wheel housing wall.

According to the configuration (5), the guard covering the outer surface of the cabin front wall is divided into the cabin guard and the wheel housing guard. The guard body is inhibited from increasing in size and is thus likely to obtain formability. Further inhibited is increase in size of molding dies used for molding these guards. Provision of the wheel housing guard can inhibit entry of an obstacle to the wheel housing.

(6) The utility vehicle has the configuration (5), and the wheel housing guard faces the wheel housing wall with a space being provided therebetween.

According to the configuration (6), the wheel housing guard is deformed toward the wheel housing wall upon receipt of impact force by a collision of an obstacle, to preferably absorb impact energy. The obstacle will more effectively be inhibited from entering the cabin through the cabin front wall.

(7) The utility vehicle has the configuration (5), and the cabin guard and the wheel housing guard have adjacent peripheral edges overlapped with each other.

The configuration (7) inhibits the cabin front wall from having a single wall structure at a joint portion between the cabin guard and the wheel housing guard.

(8) The cabin guard is fixed to the cabin front wall by a rivet.

According to the configuration (8), the rivet is initially damaged upon receipt of impact force by a collision of an obstacle, to preferably absorb impact energy.

The utility vehicle according to the present invention will inhibit entry to the cabin through the cabin front wall, of an obstacle flown up from a road surface or taken in and entering the bonnet chamber.

DETAILED DESCRIPTION OF THE INVENTION

An embodiment of the present invention will now be described with reference to the drawings. For easier description, assume that a direction a utility vehicle travels is referred to as "forward" with respect to the utility vehicle and respective components, and right and left sides of a crew directed forward correspond to "right and left sides" of the utility vehicle and these components. These drawings are schematic and dimensional ratios therein are different from the actual ratios.

Figure 1:
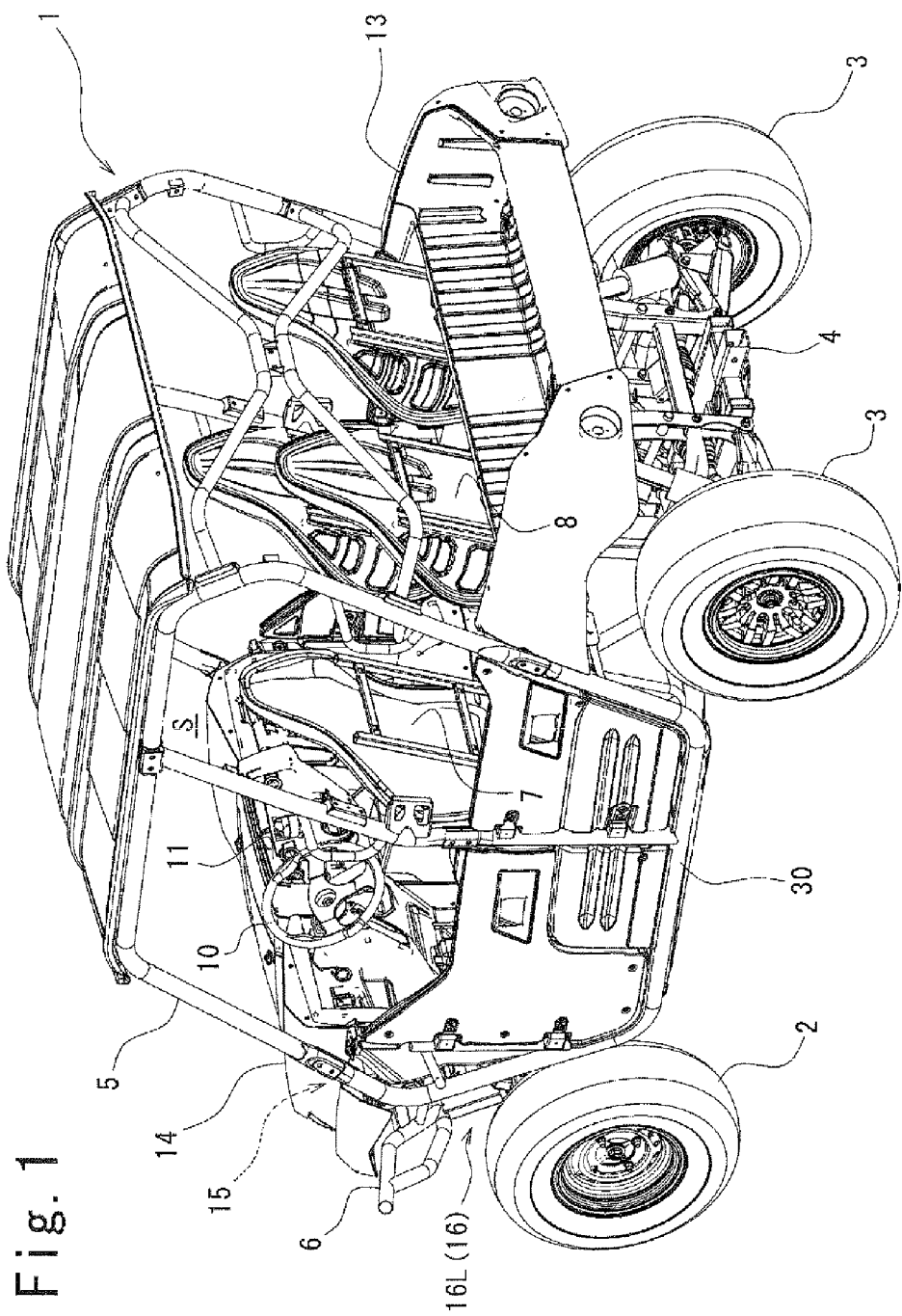
FIG. 1 is a rear perspective view of a utility vehicle according to an embodiment of the present invention.

As shown in FIG. 1, a utility vehicle 1 includes a chassis frame 4, a pair of right and left front wheels 2 disposed at the front end of the chassis frame 4, and a pair of right and left rear wheels 3 disposed at the rear end of the chassis frame 4. The chassis frame 4 includes a main frame 30 that is positioned between the front wheels 2 and the rear wheels 3 in the anteroposterior direction and defines a cabin (riding space) S provided therein. The main frame 30 has a top connected with a ROPS 5, and the cabin S is surrounded from above with the ROPS 5. The ROPS 5 is configured by a metal pipe member. The ROPS is an abbreviation for a rollover protective structure.

The cabin S accommodates front seats 7 and rear seats 8. A steering wheel 10 and a dash panel 11 are provided at the front end of the cabin S, and an engine (not shown) is provided below the front seats 7. The utility vehicle 1 further includes a carrier 13 that is disposed behind the cabin S, as well as a bonnet chamber 15 and a pair of right and left wheel housings 16R and 16L (see FIG. 2) that are disposed ahead of the cabin S. The bonnet chamber 15 is covered from above with a bonnet 14. The pair of right and left wheel housings 16R and 16L accommodates the pair of right and left front wheels 2, respectively.

Figure 2:
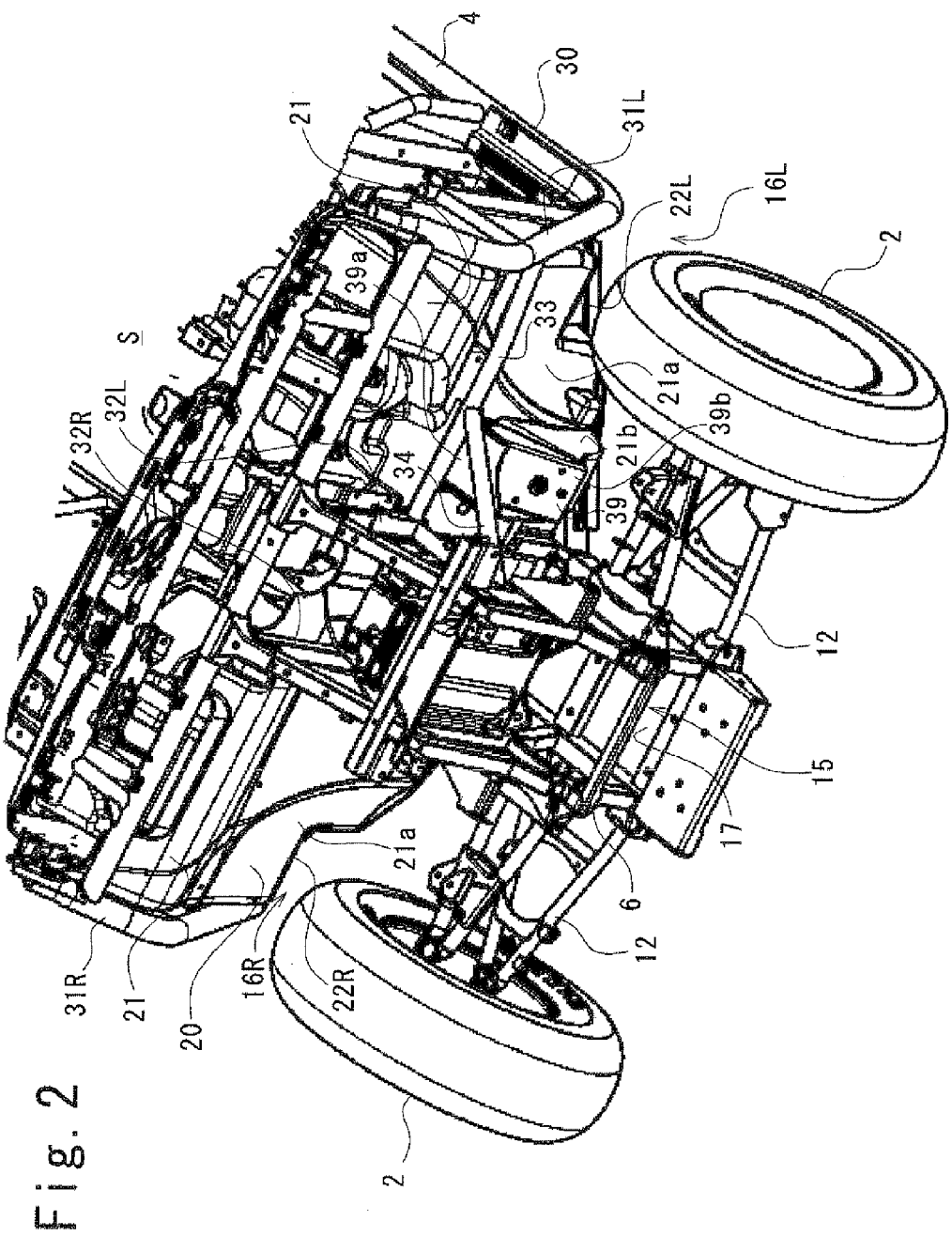
FIG. 2 is a front perspective view of a chassis frame.

FIG. 2 is a front perspective view of a front portion of the chassis frame 4 of the utility vehicle 1, and also shows a cabin front wall 20 defining the front end of the cabin S. As shown in FIG. 2, the cabin front wall 20 includes a cabin front wall body 21 anteroposteriorly separating the cabin S and the bonnet chamber 15, and a pair of right and left wheel housing walls 22R and 22L positioned under the lateral ends in the vehicle width direction of the cabin front wall body 21. The cabin front wall body 21 and the wheel housing walls 22R and 22L are made of resin and formed integrally as one-piece construction.

The cabin front wall body 21 is disposed at the front end of the main frame 30 and extends in the vehicle width direction. The cabin front wall body 21 is provided, around each of the right and left wheel housing walls 22R and 22L, with a curved surface portion 21a dented backward. The cabin front wall body 21 also has a forward projection 21b that is disposed at a position slightly shifted leftward from the center in the vehicle width direction. The projection 21b is positioned below a brake master cylinder 18 (see FIG. 3) to be described later.

The pair of right and left wheel housing walls 22R and 22L is disposed at positions behind the pair of right and left front wheels 2 and slantedly extends backward and downward to gradually decrease in height toward the rear ends, so as to configure rear wall portions defining the wheel housings 16R and 16L, respectively. The wheel housing walls 22R and 22L thus separate the cabin S and the wheel housings 16R and 16L, respectively.

The chassis frame 4 includes the main frame 30 and a front frame 6 that is connected to the center in the vehicle width direction of the front end of the main frame 30 and extends forward. The pair of the right and left front wheels 2 are supported swingably in a vertical direction at respective ends in vehicle width direction of the front frame 6 by a suspension device 12. Attached to lower end of the front frame 6 is a front under cover 17 covering the lower surface of the front frame 6.

Figure 3:
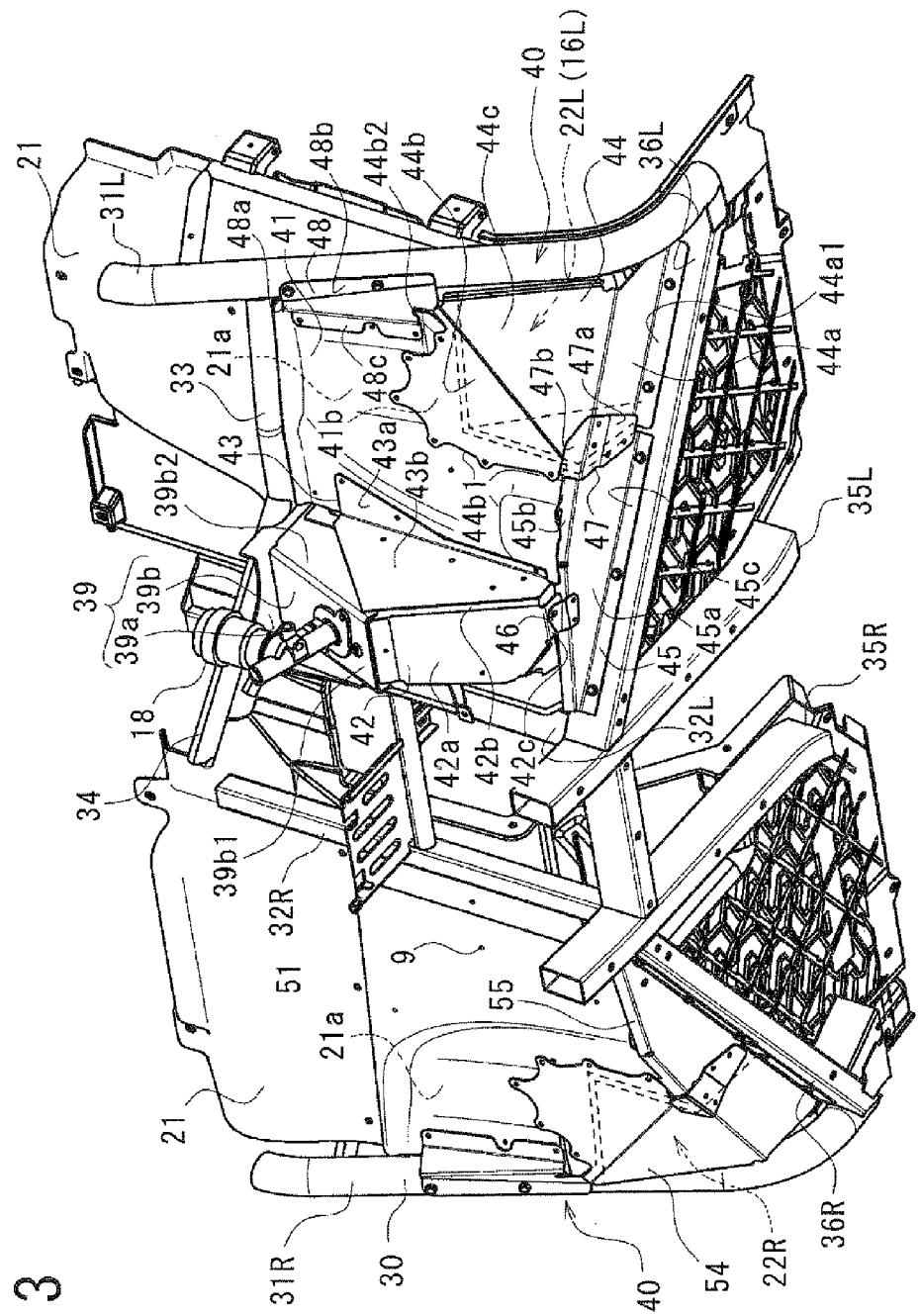
FIG. 3 is a perspective view from diagonally front left, of a cabin wall.
Figure 4:
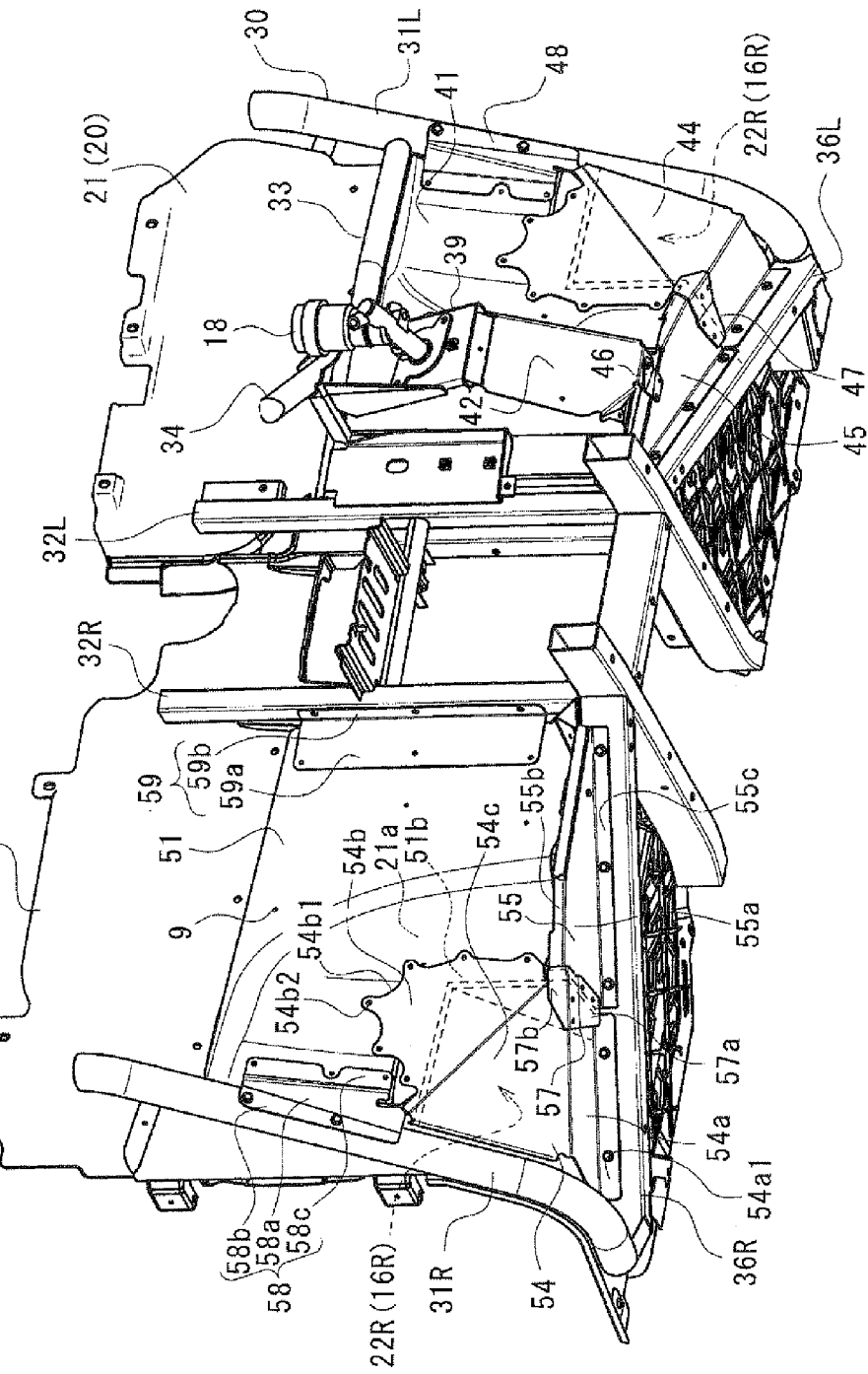
FIG. 4 is a perspective view from diagonally front right, of the cabin wall.

The main frame 30 includes a pair of right and left side vertical frames 31R and 31L that is disposed at the lateral ends in the vehicle width direction and extends vertically, and a pair of right and left center vertical frames 32R and 32L that is disposed at the center in the vehicle width direction and extends vertically (see also FIGS. 3 and 4). The front frame 6 is connected to the front ends of the center vertical frames 32R and 32L.

Connected between the left side vertical frame 31L and the left center vertical frame 32L is a cross pipe 33 that extends in the vehicle width direction. The cross pipe 33 is disposed ahead of and adjacent to the cabin front wall 20 at a position slightly shifted upward from the vertically intermediate position of the cabin front wall 20. Connected to a substantial center in the vehicle width direction of the cross pipe 33 is a coupling pipe 34 that diagonally couples the front frame 6 and the cross pipe 33.

There is provided an attachment bracket 39 that is attached to the lower ends of the cross pipe 33 and the coupling pipe 34. The attachment bracket 39 supports the brake master cylinder 18 (see FIG. 3). The attachment bracket 39 includes a base plate 39a and an attachment portion 39b for the master cylinder 18. The base plate 39a is attached to the lower surfaces of the cross pipe 33 and the coupling pipe 34 and extends substantially horizontally. The attachment portion 39b is attached to the lower end of the base plate 39a. The attachment bracket 39 is positioned adjacent to the left center vertical frame 32L.

More specifically, the attachment bracket 39 is formed by joining by welding or the like the base plate 39a, which is formed by bending a metal plate member, and the attachment portion 39b. The attachment portion 39b has an attachment surface portion 39b1 (see FIG. 3) and lateral portions 39b2 (see FIG. 3). The attachment surface portion 39b1 has a peak surface that projects forward from the cabin front wall body 21 and allows the master cylinder 18 to be attached to the peak surface. The lateral portions 39b2 extend backward from the both lateral ends of the attachment surface portion 39b1. The attachment portion 39b is formed by bending to have a channel sectional shape with a rear opening. The attachment surface portion 39b1 is directed forward and upward.

FIGS. 3 and 4 are enlarged front perspective views of the vicinity of the cabin front wall 20 but do not show the front frame 6. As shown in FIG. 3, the main frame 30 includes a pair of right and left anteroposterior frames 35R and 35L that is connected to the lower ends of the pair of right and left center vertical frames 32R and 32L and extends in the anteroposterior direction. A left lower cross frame 36L is connected between the left anteroposterior frame 35L and the lower end of the left side vertical frame 31L, whereas a right lower cross frame 36R is provided between the right anteroposterior frame 35R and the lower end of the right side vertical frame 31R.

The pair of right and left lower cross frames 36R and 36L extends horizontally to be gradually slanted backward toward the outer ends in the vehicle width direction. The cabin front wall body 21 extends substantially parallel in the vehicle width direction, and is thus gradually increased in amount of forward projection from the pair of right and left lower cross frames 36L and 36R toward the outer ends in the vehicle width direction.

The utility vehicle 1 according to an embodiment of the present invention includes a guard body 40 covering the outer surface of the cabin front wall 20 from ahead. The guard body 40 is provided, on the left side of the front frame 6 (see FIG. 2), with first to third left cabin guards 41 to 43, a left wheel housing guard 44, and a left lower guard 45. The first to third left cabin guards 41 to 43 cover the outer surface of the cabin front wall body 21 from ahead. The left wheel housing guard 44 covers the outer surface of the left wheel housing wall 22L from ahead and below. The left lower guard 45 covers the forward projection of the cabin front wall body 21 from the lower cross frame 36L from below.

As shown in FIG. 4, the guard body 40 is provided, on the right side of the front frame 6, with a right cabin guard 51, a right wheel housing guard 54, and a right lower guard 55. The right cabin guard 51 covers the outer surface of the cabin front wall body 21 from ahead. The right wheel housing guard 54 covers the outer surface of the right wheel housing wall 22R from ahead and below. The right lower guard 55 covers the forward projection of the cabin front wall body 21 from the lower cross frame 36R from below. Description will now be made to each of the guards.

Initially specifically described are the first to third left cabin guards 41 to 43, the left wheel housing guard 44, and the left lower guard 45 included in the guard body 40 and positioned on the left side of the front frame 6.

The first left cabin guard 41 is a plate member formed substantially along the outer surface of the cabin front wall body 21, and is fixed to the cabin front wall body 21 by a plurality of rivets 9. Specifically, in a front view, the first left cabin guard 41 extends in the vehicle width direction between the left side vertical frame 31L and the attachment bracket 39, and extends in the vertical direction between the left lower cross frame 36L and the cross pipe 33. In other words, the first left cabin guard 41 entirely covers from ahead, a region outside the attachment bracket 39 in the vehicle width direction and below the cross pipe 33, out of the cabin front wall body 21.

Figure 5:
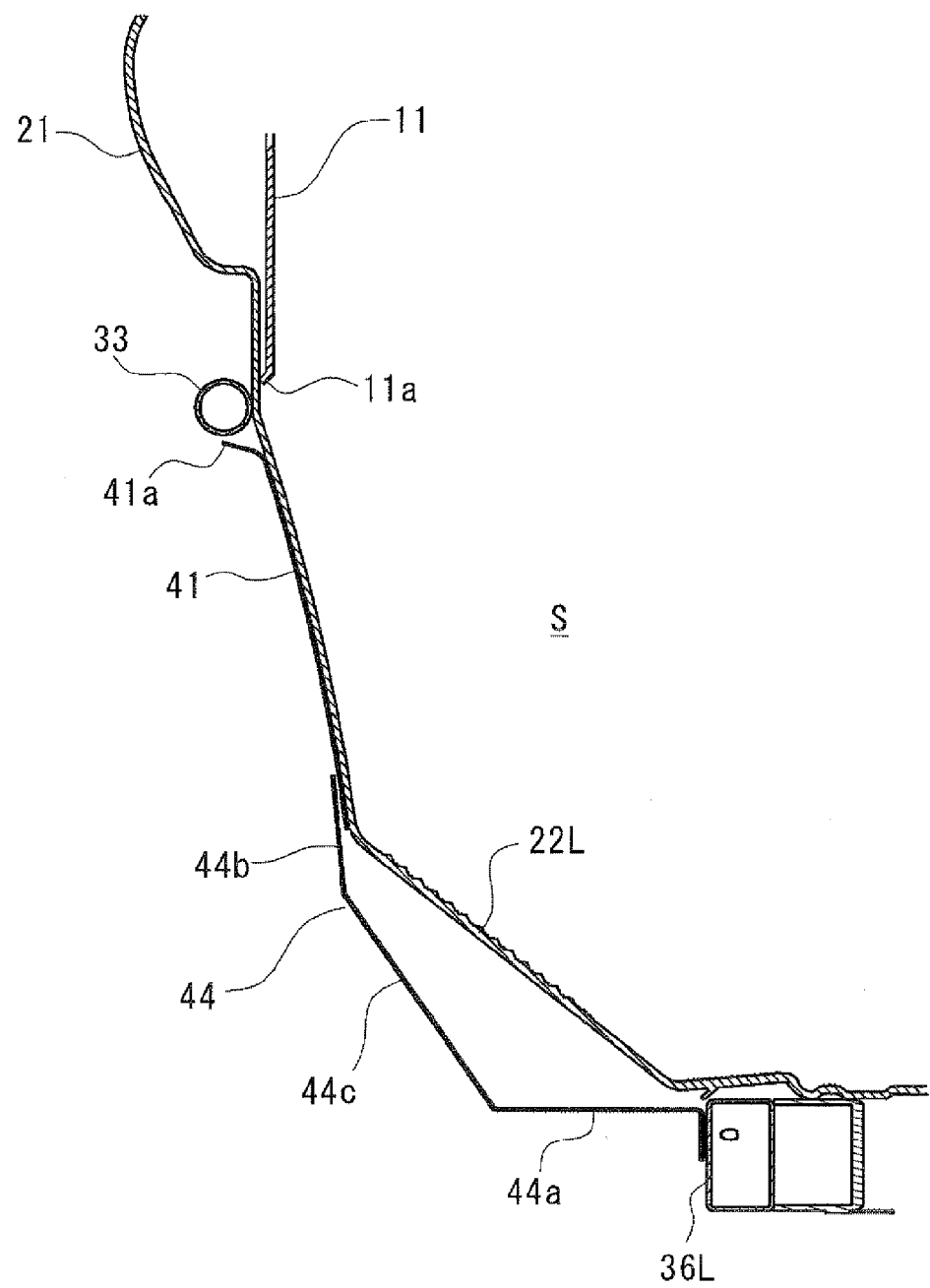
FIG. 5 is a sectional view taken along line V-V indicated in FIG. 14.
Figure 14:
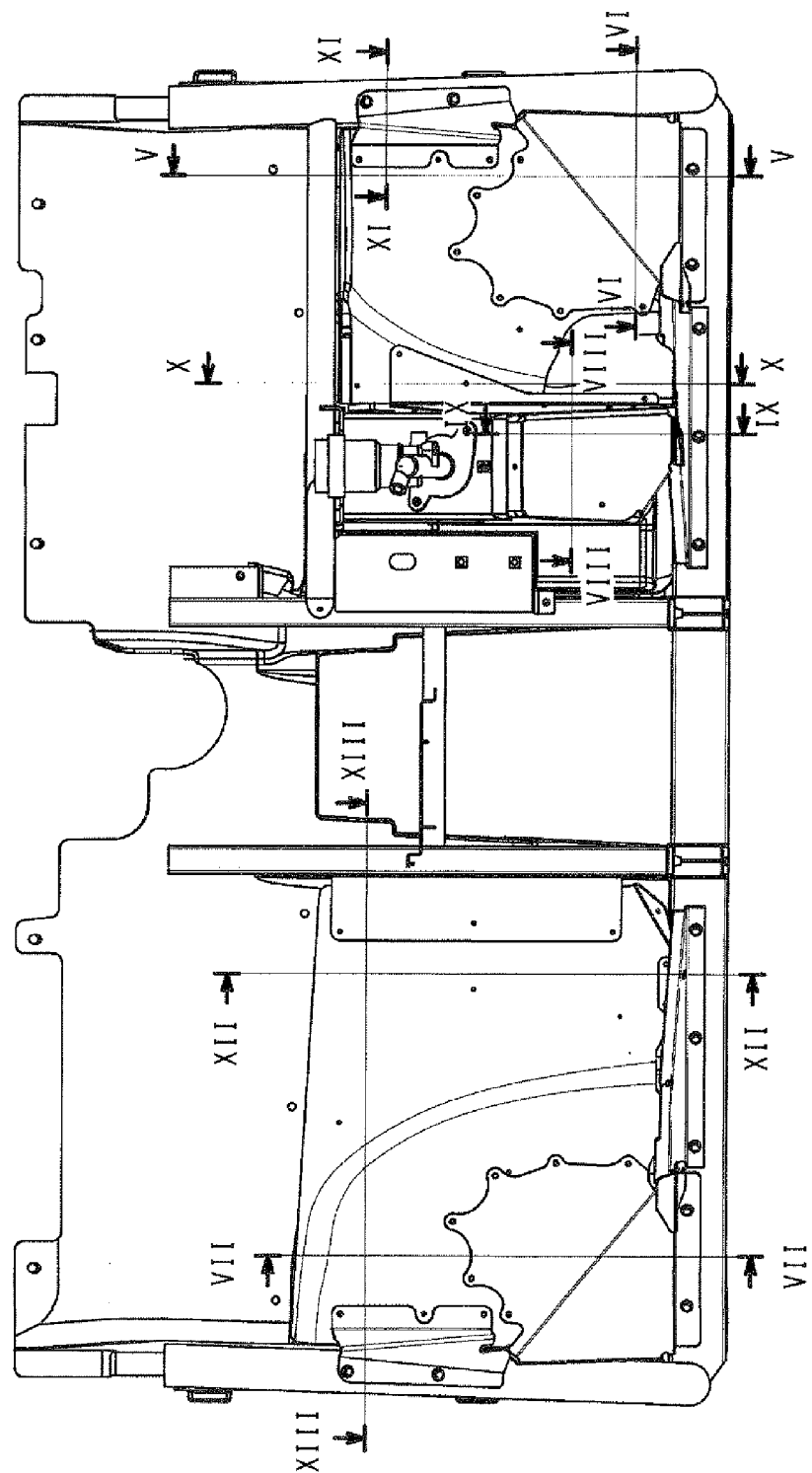
FIG. 14 is a front view of the chassis frame.

As shown in FIG. 5 of a sectional view taken along line V-V indicated in FIG. 14, the dash panel 11 has a lower end 11a positioned on a surface facing the cabin S of the cabin front wall body 21 and just above the cross pipe 33 in the vertical direction. In other words, an upper end 41a of the first left cabin guard 41, the cross pipe 33, and the lower end 11a of the dash panel 11 are aligned substantially continuously in the vertical direction. The cabin front wall body 21 thus has a double wall structure across the height, which is configured by the first left cabin guard 41, the cross pipe 33, and the dash panel 11 on the left side of the front frame 6, more particularly, on the left side of the attachment bracket 39.

As shown in FIG. 3, the second left cabin guard 42 covers the projection 21b (see FIG. 2) of the cabin front wall body 21 projecting forward correspondingly to the lower end of the attachment bracket 39 from ahead. Specifically, the second left cabin guard 42 is a plate member that is formed into an L sectional shape and has a front surface portion 42a and a side surface portion 42b. The front surface portion 42a extends vertically from the lower edge of the attachment surface portion 39b1 of the attachment bracket 39 to the lower end of the cabin front wall body 21. The side surface portion 42b extends anteroposteriorly from the outer edge in the vehicle width direction of the front surface portion 42a to the cabin front wall body 21.

The second left cabin guard 42 also has a lower surface portion 42c extending from the lower edge of the front surface portion 42a toward the cabin front wall body 21. The front surface portion 42a of the second left cabin guard 42 is fixed to the projection 21b of the cabin front wall body 21 by a plurality of rivets 9.

The third left cabin guard 43 extends between the side surface portion 42b of the second left cabin guard 42 and the first left cabin guard 41. The third left cabin guard 43 is a plate member that is formed into an L sectional shape and has a front surface portion 43a and a side surface portion 43b. The front surface portion 43a is overlapped with the outer surface of the first left cabin guard 41. The side surface portion 43b is overlapped with the outer surface outside in the vehicle width direction of the side surface portion 42b of the second left cabin guard 42.

Figure 8:
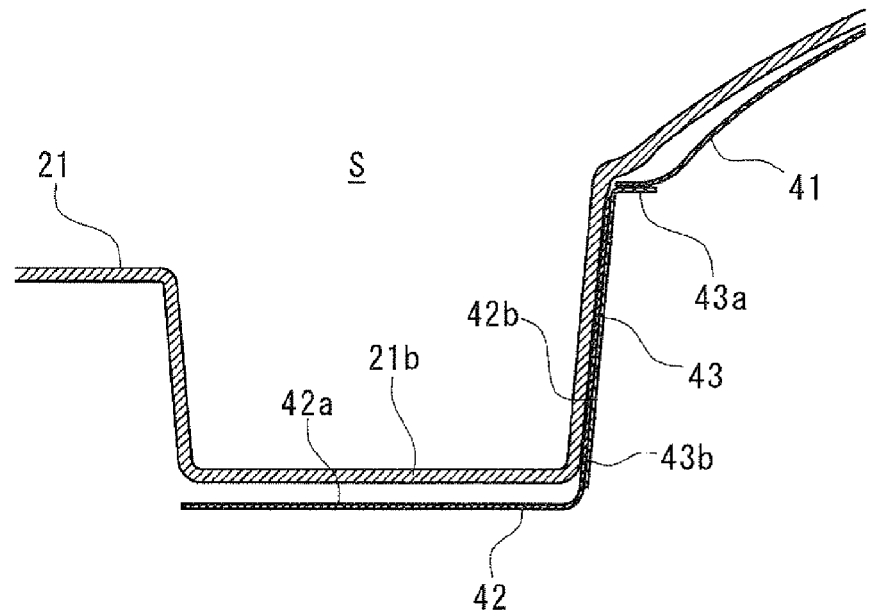
FIG. 8 is a sectional view taken along line VIII-VIII indicated in FIG. 14.

With reference also to FIG. 8 of a sectional view taken along line VIII-VIII indicated in FIG. 14, the front surface portion 43a of the third left cabin guard 43 is fixed to the cabin front wall body 21 by a plurality of rivets 9 with the right end of the first left cabin guard 41 being interposed therebetween. The side surface portion 43b of the third left cabin guard 43 is fixed to the projection 21b of the cabin front wall body 21 by a plurality of rivets 9 with the side surface portion 42b of the second left cabin guard 42 being interposed therebetween. The right end of the first left cabin guard 41 and the side surface portion 42b of the second left cabin guard 42 are thus jointly fastened so as to fix the third left cabin guard 43 to the cabin front wall body 21.

As shown in FIG. 3, the left wheel housing guard 44 is a plate member including a lower surface portion 44a, a front surface portion 44b, and a slanted surface portion 44c. The lower surface portion 44a extends forward from the front end of the left lower cross frame 36L. The front surface portion 44b is overlapped with the first left cabin guard 41 and extends vertically along the curved surface portion 21a of the cabin front wall body 21 around the left wheel housing 16L. The slanted surface portion 44c connects the lower surface portion 44a and the front surface portion 44b. The lower surface portion 44a is provided at the rear end with a flange 44a1 and is screwed to the front end of the left lower cross frame 36L via the flange 44a1.

The front surface portion 44b has a peripheral edge 44b1 that is overlapped with the outer surface of a peripheral edge 41b, close to the wheel housing 16L, of the first left cabin guard 41 so as to generate no gap between the first left cabin guard 41 and the left wheel housing guard 44 in a front view.

The peripheral edge 44b1 of the front surface portion 44b has an uneven contour. The front surface portion 44b also has a plurality of attachment portions 44b2 projecting radially at the peripheral edge 44b1. Each of the attachment portions 44b2 is fixed to the curved surface portion 21a of the cabin front wall body 21 by a rivet 9 with the first left cabin guard 41 being interposed therebetween. The first left cabin guard 41 is jointly fastened so as to fix the left wheel housing guard 44 to the cabin front wall body 21.

The attachment portions 44b2 of the left wheel housing guard 44 are bent at proximal portions so as to easily be formed along the curved surface portion 21a of the cabin front wall body 21 formed in a three-dimensional surface. Accordingly, the left wheel housing guard 44 is easily formed by linearly bending a flat plate to have the lower surface portion 44a, the front surface portion 44b, and the slanted surface portion 44c, whereas the plurality of attachment portions 44b2 of the front surface portion 44b is easily fitted along the curved surface portion 21a of the cabin front wall body 21.

Figure 6:
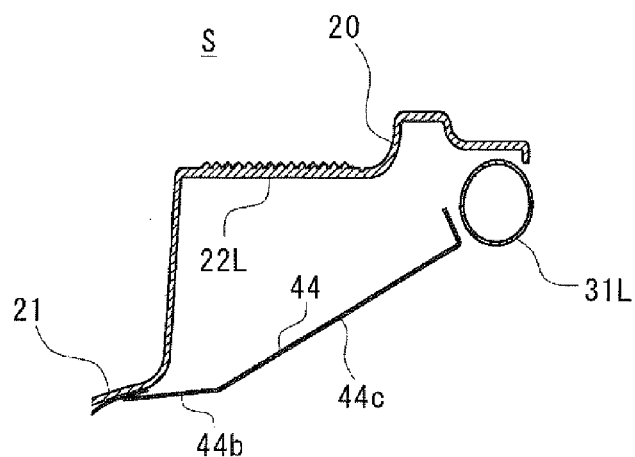
FIG. 6 is a sectional view taken along line VI-VI indicated in FIG. 14.

As shown in FIG. 5 and FIG. 6 of a sectional view taken along line VI-VI indicated in FIG. 14, at least the slanted surface portion 44c of the left wheel housing guard 44 faces the left wheel housing wall 22L with a space being provided therebetween. This space allows the left wheel housing guard 44 to be deformed backward in a case where an obstacle flown up from a road surface or taken in hits the left wheel housing guard 44. In other words, the space between the left wheel housing guard 44 and the wheel housing wall 22L is provided as a clashable zone enabling preferred absorption of obstacle impact energy.

As shown in FIG. 3, the left lower guard 45 is a plate member including a horizontal surface portion 45a extending forward from the front end of the left lower cross frame 36L, a front surface portion 45b extending upward from the front edge of the horizontal surface portion 45a, and a flange 45c extending downward from the rear edge of the horizontal surface portion 45a. The horizontal surface portion 45a is positioned adjacent to the inner end in the vehicle width direction of the lower surface portion 44a of the left wheel housing guard 44. The left lower guard 45 is screwed to the front end of the lower cross frame 36L via the flange 45c.

Figure 9:
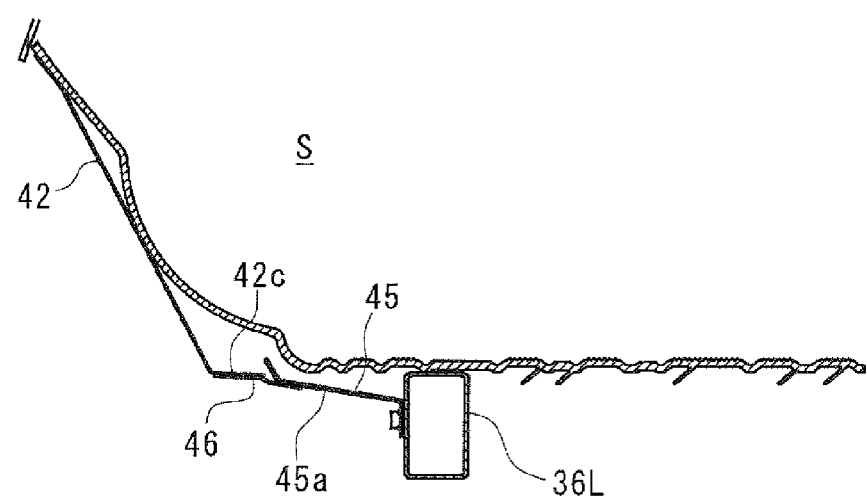
FIG. 9 is a sectional view taken along line IX-IX indicated in FIG. 14.

Fixed to the lower surface of the horizontal surface portion 45a of the left lower guard 45 by a rivet 9 is a first left extension guard 46 that extends forward beyond the horizontal surface portion 45a. With reference also to FIG. 9 of a sectional view taken along line IX-IX indicated in FIG. 14, the front end of the first left extension guard 46 is screwed to the lower surface portion 42c of the second left cabin guard 42.

Figure 10:
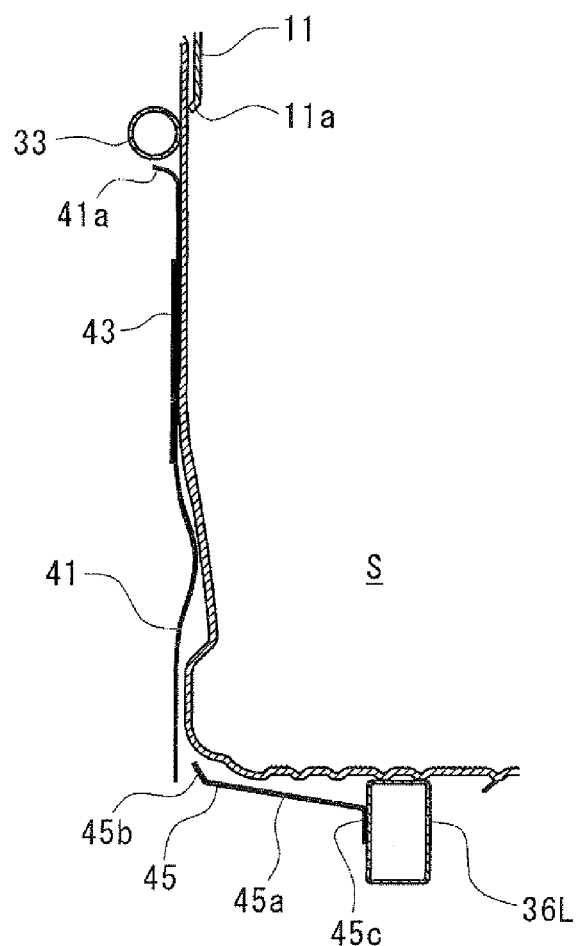
FIG. 10 is a sectional view taken along line X-X indicated in FIG. 14.

With reference also to FIG. 10 of a sectional view taken along line X-X indicated in FIG. 14, the front surface portion 45b of the left lower guard 45 is anteroposteriorly overlapped with the lower end of the first left cabin guard 41. This configuration inhibits generation of a gap between the lower end of the first left cabin guard 41 and the front surface portion 45b of the left lower guard 45 in a front view.

As shown in FIG. 3, there is provided a second left extension guard 47 extending between the lower surface portion 44a of the left wheel housing guard 44 and the horizontal surface portion 45a of the left lower guard 45. The second left extension guard 47 includes a lower surface portion 47a and a front surface portion 47b. The lower surface portion 47a is formed along the lower surface portion 44a of the left wheel housing guard 44 and the lower surface of the horizontal surface portion 45a of the left lower guard 45. The front surface portion 47b extends upward from the front edge of the lower surface portion 47a.

The lower surface portion 47a of the second left extension guard 47 is fixed by rivets 9 to the lower surface portion 44a of the left wheel housing guard 44 and the horizontal surface portion 45a of the left lower guard 45. The front surface portion 47b of the second left extension guard 47 extends in front of the slanted surface portion 44c of the left wheel housing guard 44 and the front surface portion 45b of the left lower guard 45. This configuration inhibits generation of a gap between the slanted surface portion 44c of the left wheel housing guard 44 and the front surface portion 45b of the left lower guard 45 in a front view.

As shown in FIG. 3, there is provided a left side cabin guard 48 extending between the first left cabin guard 41 and the left side vertical frame 31L. The left side cabin guard 48 is a plate member and includes a projection 48a extending vertically and projecting forward to have a rib shape, and attachment portions 48b and 48c provided at the right and left ends of the projection 48a and extending vertically. The projection 48a improves vertically bending rigidity of the left side cabin guard 48.

Figure 11:
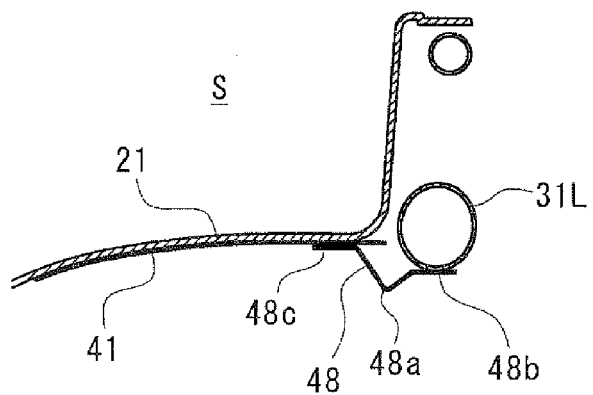
FIG. 11 is a sectional view taken along line XI-XI indicated in FIG. 14.

With reference also to FIG. 11 of a sectional view taken along line XI-XI indicated in FIG. 14, the left side cabin guard 48 is screwed to the left side vertical frame 31L via the attachment portion 48b positioned outside in the vehicle width direction. The left side cabin guard 48 is fixed by a rivet 9 to the cabin front wall body 21 via the attachment portion 48c positioned inside in the vehicle width direction with the left end of the first left cabin guard 41 being interposed therebetween. The left end of the first left cabin guard 41 is thus jointly fastened so as to fix the left side cabin guard 48 to the cabin front wall body 21.

Described next are the right cabin guard 51, the right wheel housing guard 54, and the right lower guard 55 included in the guard body 40 and positioned on the right side of the front frame 6.

As shown in FIG. 4, the right cabin guard 51 is a plate member formed substantially along the outer surface of the cabin front wall body 21, and is fixed to the cabin front wall body 21 by a plurality of rivets 9. Specifically, in a front view, the right cabin guard 51 extends in the vehicle width direction between the right side vertical frame 31R and the right center vertical frame 32R, and extends upward from the right lower cross frame 36R to a position slightly above a vertically intermediate position of the cabin front wall 20. In other words, between the right side vertical frame 31R and the center vertical frame 32R, the right cabin guard 51 covers an entire region extending downward from a position slightly above a vertically intermediate position in the cabin front wall body 21 from ahead.

Figure 12:
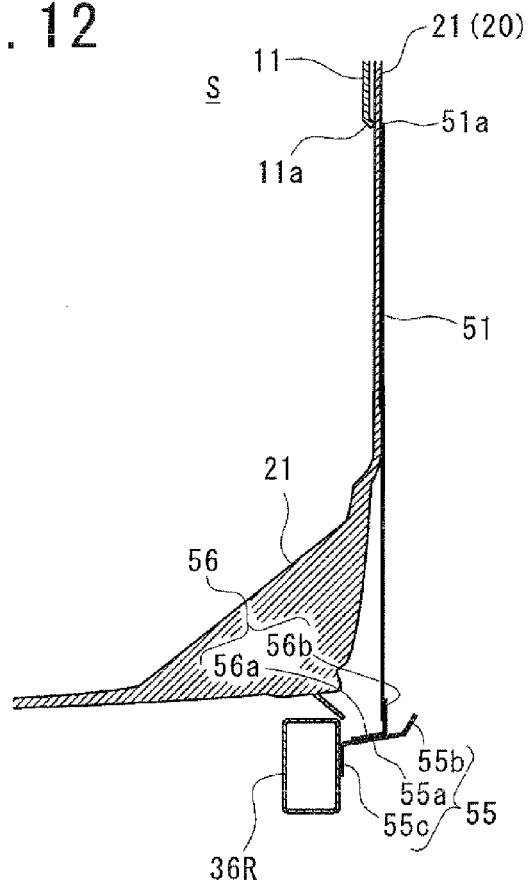
FIG. 12 is a sectional view taken along line XII-XII indicated in FIG. 14.

As shown in FIG. 12 of a sectional view taken along line XII-XII indicated in FIG. 14, the lower end 11a of the dash panel 11 is positioned on the surface facing the cabin S of the cabin front wall body 21 at a level substantially as high as an upper end 51a of the right cabin guard 51. In other words, the upper end 51a of the right cabin guard 51 and the lower end 11a of the dash panel 11 are aligned substantially continuously in the vertical direction. The cabin front wall body 21 thus has a double wall structure across the height, which is configured by the right cabin guard 51 and the dash panel 11 on the right side of the front frame 6.

As shown in FIG. 4, the right wheel housing guard 54 is a plate member including a lower surface portion 54a, a front surface portion 54b, and a slanted surface portion 54c. The lower surface portion 54a extends forward from the front end of the right lower cross frame 36R. The front surface portion 54b is overlapped with the first right cabin guard 51 and extends vertically along the curved surface portion 21a of the cabin front wall body 21 around the right wheel housing 16R. The slanted surface portion 54c connects the lower surface portion 54a and the front surface portion 54b. The lower surface portion 54a is provided at the rear end with a flange 54a1 and is screwed to the front end of the right lower cross frame 36R via the flange 54a1.

The front surface portion 54b has a peripheral edge 54b1 that is overlapped with the outer surface of a peripheral edge 51b, close to the wheel housing 16R, of the right cabin guard 51 so as to generate no gap between the right cabin guard 51 and the right wheel housing guard 54 in a front view.

The peripheral edge 54b1 of the front surface portion 54b has an uneven contour. The front surface portion 54b also has a plurality of attachment portions 54b2 projecting radially at the peripheral edge 54b1. Each of the attachment portions 54b2 is fixed to the curved surface portion 21a of the cabin front wall body 21 by a rivet 9 with the right cabin guard 51 being interposed therebetween. The right cabin guard 51 is jointly fastened so as to fix the right wheel housing guard 54 to the cabin front wall body 21.

The attachment portions 54b2 of the right wheel housing guard 54 are bent at proximal portions so as to easily be formed along the curved surface portion 21a of the cabin front wall body 21 formed in a three-dimensional surface. Accordingly, the right wheel housing guard 54 is easily formed by linearly bending a flat plate to have the lower surface portion 54a, the front surface portion 54b, and the slanted surface portion 54c, whereas the plurality of attachment portions 54b2 of the front surface portion 54b is easily fitted along the curved surface portion 21a of the cabin front wall body 21.

Figure 7:
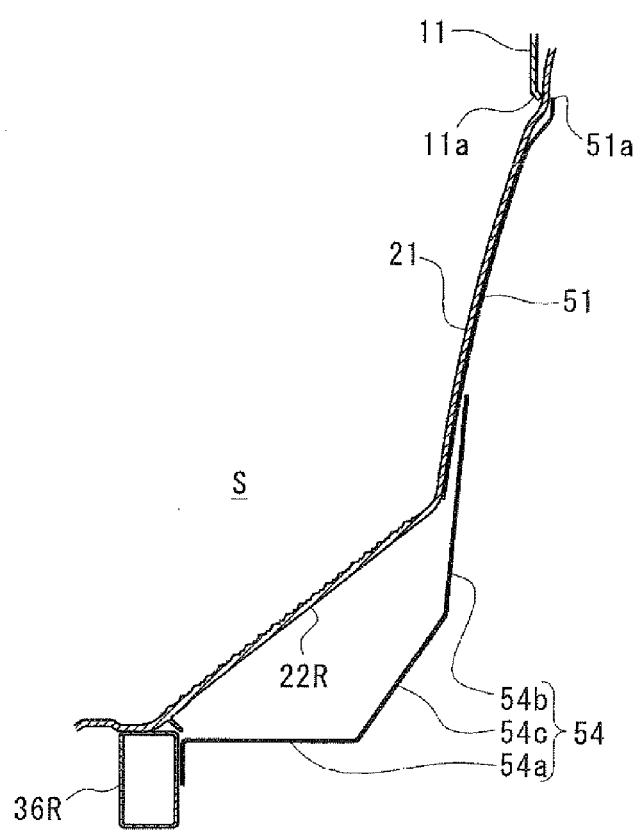
FIG. 7 is a sectional view taken along line VII-VII indicated in FIG. 14.

As shown in FIG. 7 of a sectional view taken along line VII-VII indicated in FIG. 14, at least the slanted surface portion 54c of the right wheel housing guard 54 faces the right wheel housing wall 22R with a space being provided therebetween. This space allows the right wheel housing guard 54 to be deformed backward in a case where an obstacle flown up from a road surface or taken in hits the right wheel housing guard 54. In other words, the space between the right wheel housing guard 54 and the wheel housing wall 22R is provided as a clashable zone enabling preferred absorption of obstacle impact energy.

As shown in FIG. 4, the right lower guard 55 is a plate member including a horizontal surface portion 55a extending forward from the front end of the right lower cross frame 36R, a front surface portion 55b extending upward from the front edge of the horizontal surface portion 55a, and a flange 55c extending downward from the rear edge of the horizontal surface portion 55a. The horizontal surface portion 55a is positioned adjacent to the inner end in the vehicle width direction of the lower surface portion 54a of the right wheel housing guard 54. The right lower guard 55 is screwed to the front end of the lower cross frame 36R via the flange 55c.

As shown in FIG. 12, a first right extension guard 56 is screwed to the upper surface of the horizontal surface portion 55a of the right lower guard 55. The first right extension guard 56 includes a horizontal surface portion 56a extending along the horizontal surface portion 55a of the right lower guard 55, and a front surface portion 56b extending upward from the front end of the horizontal surface portion 56a. The front surface portion 56b of the first right extension guard 56 is fixed from the front side to the lower end of the right cabin guard 51 by a rivet 9.

The front surface portion 55b of the right lower guard 55 is anteroposteriorly overlapped with the lower end of the right cabin guard 51. This configuration inhibits generation of a gap between the lower end of the right cabin guard 51 and the front surface portion 55b of the right lower guard 55 in a front view.

As shown in FIG. 4, there is provided a second right extension guard 57 extending between the lower surface portion 54a of the right wheel housing guard 54 and the horizontal surface portion 55a of the right lower guard 55. The second right extension guard 57 includes a lower surface portion 57a and a front surface portion 57b. The lower surface portion 57a is formed along the lower surface portion 54a of the right wheel housing guard 54 and the lower surface of the horizontal surface portion 55a of the right lower guard 55. The front surface portion 57b extends upward from the front edge of the lower surface portion 57a.

The lower surface portion 57a of the second right extension guard 57 is fixed by rivets 9 to the lower surface portion 54a of the right wheel housing guard 54 and the horizontal surface portion 55a of the right lower guard 55. The front surface portion 57b of the second right extension guard 57 extends in front of the slanted surface portion 54c of the right wheel housing guard 54 and the front surface portion 55b of the right lower guard 55. This configuration inhibits generation of a gap between the slanted surface portion 54c of the right wheel housing guard 54 and the front surface portion 55b of the right lower guard 55 in a front view.

As shown in FIG. 4, there is provided a first right side cabin guard 58 extending between the right cabin guard 51 and the right side vertical frame 31R. The first right side cabin guard 58 is a plate member and includes a projection 58a extending vertically and projecting forward to have a rib shape, and attachment portions 58b and 58c provided at the right and left ends of the projection 58a and extending vertically. The projection 58a improves vertically bending rigidity of the first right side cabin guard 58.

Figure 13:
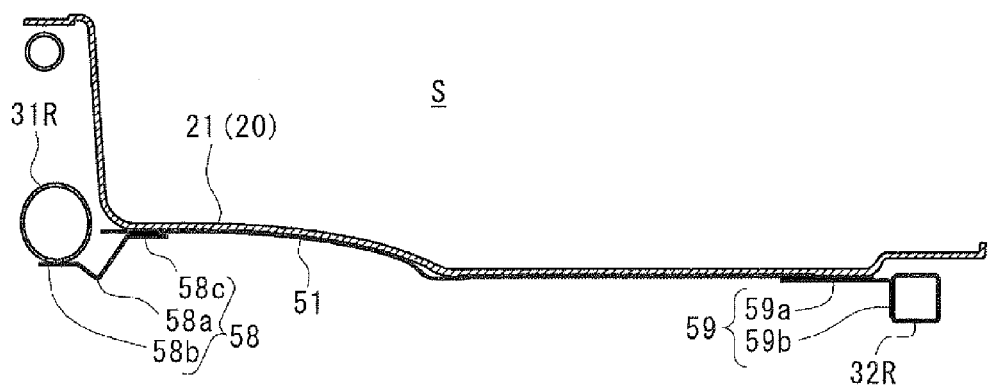
FIG. 13 is a sectional view taken along line XIII-XIII indicated in FIG. 14.

With reference also to FIG. 13 of a sectional view taken along line XIII-XIII indicated in FIG. 14, the first right side cabin guard 58 is screwed to the right side vertical frame 31R via the attachment portion 58b positioned outside in the vehicle width direction. The first right side cabin guard 58 is fixed by a rivet 9 to the cabin front wall body 21 via the attachment portion 58c positioned inside in the vehicle width direction with the right end of the right cabin guard 51 being interposed therebetween. The right end of the right cabin guard 51 is thus jointly fastened so as to fix the first right side cabin guard 58 to the cabin front wall body 21.

As shown in FIG. 4, there is provided a second right side cabin guard 59 extending between the right cabin guard 51 and the right center vertical frame 32R. The second right side cabin guard 59 is a plate member having an L sectional shape and including a front surface portion 59a extending vertically along the right cabin guard 51, and a side surface portion 59b extending vertically along the side surface outside in the vehicle width direction of the center vertical frame 32R.

With reference also to FIG. 13, the second right side cabin guard 59 is fixed by a rivet 9 to the cabin front wall body 21 via the front surface portion 59a with the left end of the right cabin guard 51 being interposed therebetween. The left end of the right cabin guard 51 is thus jointly fastened so as to fix the second right side cabin guard 59 to the cabin front wall body 21. The second right side cabin guard 59 is screwed to the outer end in the vehicle width direction of the center vertical frame 32R via the side surface portion 59b.

The guard body 40 is made of a bent metal plate member, and the guards included in the guard body 40 are increased in thickness as the guards are to be disposed at vertically lower levels. In the present embodiment, the left lower guard 45 and the right lower guard 55 have the largest thickness of 2.0 mm, and the left wheel housing guard 44 and the right wheel housing guard 54 have the second largest thickness of 1.6 mm. The remaining guards are 1.2 mm thick.

The guards covering a lower region of the cabin front wall 20, which is particularly likely to be hit by an obstacle flown up from a road surface or taken in by the front wheel 2 and entering the bonnet chamber 15, are made relatively thicker. This configuration will more effectively inhibit an obstacle from passing through the cabin front wall 20.

Those thicker guards initially receive impact of a hitting obstacle whereas the remaining guards are bent to subsequently absorb impact energy. In particular, the left wheel housing guard 44 and the right wheel housing guard 54 are made thick and are also provided with the clashable zones between the left and right wheel housing guards 44 and 54 and the wheel housing walls 22L and 22R disposed therebehind. The left wheel housing guard 44 and the right wheel housing guard 54 receive initial impact loads as well as are deformed to preferably absorb impact energy.

When the lower guards are made thicker than the upper guards, the entire guard body 40 has a lower center of gravity. This configuration inhibits increase in height of the center of gravity of the utility vehicle 1 due to provision of the guard body 40.

The utility vehicle 1 thus configured achieves the following effects.

The cabin front wall 20 positioned at the front end of the cabin S has the double wall structure by provision of the guard body 40 covering the outer surface of the cabin front wall 20. An obstacle flown up from a road surface or taken in and entering the bonnet chamber 15 will thus be inhibited from entering the cabin S through the cabin front wall 20.

The guard body 40 is divided into the first to third left cabin guards 41 to 43 and the right cabin guard 51 covering the cabin front wall body 21 and the left wheel housing guard 44 and the right wheel housing guard 54 covering the wheel housing walls 22L and 22R. The guard body 40 is thus likely to achieve formability in comparison to a case where the guard body 40 is formed integrally. In particular, the left half of the cabin front wall body 21 is provided with the projection 21b. The second left cabin guard 42 covering the projection 21b is provided separately from the first left cabin guard 41 to simplify the shapes of the first and second left cabin guards 41 and 42. The third left cabin guard 43 extends between the first left cabin guard 41 and the second left cabin guard 42, to prevent the region between the first left cabin guard 41 and the second left cabin guard 42 from having a single wall structure in a front view. Further inhibited is increase in size of molding dies used for molding the guards in the guard body 40, so as to inhibit deterioration in productivity.

The peripheral edges of the first left cabin guard 41 and the left wheel housing guard 44 are overlapped with each other at corresponding portions, so as to prevent the cabin front wall 20 from having a single wall structure at the joint portion between the first left cabin guard 41 and the left wheel housing guard 44. The joint portion between the right cabin guard 51 and the right wheel housing guard 54 is similarly prevented from having a single wall structure.

The first to third left cabin guards 41 to 43 and the right cabin guard 51 are configured to be formed substantially along the cabin front wall body 21. These guards are thus easily attached to the cabin front wall body 21.

At the left half of the cabin front wall body 21, the upper end 41a of the first left cabin guard 41, the cross pipe 33, and the lower end 11a of the dash panel 11 are aligned substantially continuously in the vertical direction. The first left cabin guard 41, the cross pipe 33, and the dash panel 11 thus configure the double wall structure substantially continuously across the height. The cabin front wall 20 effectively achieves the double wall structure of a predetermined vertical length whereas the first left cabin guard 41 is inhibited from increasing in vertical size.

At the right half of the cabin front wall body 21, the upper end 51a of the right cabin guard 51 and the lower end 11a of the dash panel 11 are aligned substantially continuously in the vertical direction. The right cabin guard 51 and the dash panel 11 thus configure the double wall structure substantially continuously across the height. The cabin front wall 20 effectively achieves the double wall structure of a predetermined vertical length whereas the right cabin guard 51 is inhibited from increasing in vertical size.

The guard body 40 is divided into the two portions on the each side of the front frame 6. The first to third left cabin guards 41 to 43 and the right cabin guard 51 are disposed on the left and right sides, respectively, in the vehicle width direction in the portion of the cabin front wall 20, where the front frame 6 inhibits entry of an obstacle to the bonnet chamber 15. The guard body 40 is reduced in size in the vehicle width direction, and an obstacle will be inhibited from entering the cabin across the vehicle width.

The left wheel housing guard 44 faces the left wheel housing wall 22L with the space being provided therebetween. This space serves as a clashable zone enabling preferred absorption of impact energy due to a collision of an obstacle. Similarly, the space defined between the right wheel housing guard 54 and the right wheel housing wall 22R serves as a clashable zone enabling preferred absorption of impact energy due to a collision of an obstacle. This configuration more effectively inhibits an obstacle from passing through the wheel housing walls 22L and 22R.

The first to third left cabin guards 41 to 43 and the right cabin guard 51 are fixed to the cabin front wall body 21 by the rivets 9. Upon receipt of impact force by a collision of an obstacle, the rivets 9 are initially damaged to achieve preferred absorption of impact energy.

The guard body 40 is configured by the plurality of divided guards to achieve appropriately balanced weight and strength. Particularly at the lower portion likely to be hit by an obstacle, the left lower guard 45 and the right lower guard 55 are made relatively thicker to be improved in strength and durable against an impact load. At the upper portion, the first to third left cabin guards 41 to 43 and the right cabin guard 51 are made relatively thinner to be deformed and absorb impact energy. The guard body 40 is configured by the plurality of divided guards to minimize a replacement section for maintenance and improve maintainability.

The present invention can be modified or changed in various manners without departing from the spirit and scope of the present invention recited in the following claims.

What is claimed is:

1. A cabin front wall structure for a utility vehicle comprising a pair of right and left front wheels, a pair of right and left rear wheels, a main frame positioned between the front wheels and the rear wheels, a cabin defined by the main frame, and an engine disposed under the cabin, the cabin front wall structure comprising:

a cabin front wall defining a front end of the cabin, the cabin front wall including a cabin front wall body separating the cabin and a bonnet chamber provided ahead of the cabin, and including a wheel housing wall separating the cabin and each of right and left front wheel housings, the cabin front wall structure further comprising a cabin guard covering an outer surface of the cabin front wall body from ahead.

2. The front wall structure for a utility vehicle according to claim 1, wherein the cabin guard is a plate member, which is formed along the outer surface of the cabin front wall body.

3. The front wall structure for a utility vehicle according to claim 1, further comprising a cross pipe provided adjacent to the cabin front wall and extending in a vehicle width direction, wherein:

the cross pipe is positioned above a vertically intermediate position of the cabin front wall; and the cabin guard extends from a lower end of the cabin front wall to a position just below the cross pipe in a vertical direction.

4. The front wall structure for a utility vehicle according to claim 1, further comprising a dash panel provided to the cabin front wall on a surface facing the cabin, wherein the cabin guard extends from a lower end of the cabin front wall to a position just below the dash panel in a vertical direction.

5. The front wall structure for a utility vehicle according to claim 1, further comprising a front frame connected to a front end of the main frame and swingably supporting, in a vertical direction, the pair of right and left front wheels, wherein the cabin guard is divided into two portions on each side of the front frame.

6. The front wall structure for a utility vehicle according to claim 1, further comprising a wheel housing guard covering an outer surface of the wheel housing wall.

7. The front wall structure for a utility vehicle according to claim 6, wherein the wheel housing guard faces the wheel housing wall with a space being provided therebetween.

8. The front wall structure for a utility vehicle according to claim 6, wherein the cabin guard and the wheel housing guard have adjacent peripheral edges overlapped with each other.

9. The front wall structure for a utility vehicle according to claim 1, wherein the cabin guard is fixed to the cabin front wall by a rivet.

10. The front wall structure for a utility vehicle according to claim 6, wherein the wheel housing guard includes a plurality of attachment portions projecting radially at a peripheral edge thereof so as to have an uneven contour.

11. The front wall structure for a utility vehicle according to claim 6, wherein the wheel housing guard is thicker than the cabin guard.

* * * * *